United States Patent [19]

Brophy et al.

[11] 3,953,280

[45] Apr. 27, 1976

[54] TEAR SEAL APPARATUS

[75] Inventors: Thomas G. Brophy, Gloucester; Douglas H. Crowell, West Gloucester; John G. Hollick, Beverly, all of Mass.

[73] Assignee: USM Corporation, Boston, Mass.

[22] Filed: Apr. 30, 1974

[21] Appl. No.: 465,608

[52] U.S. Cl.............................. 156/515; 156/562; 156/581; 156/583
[51] Int. Cl.²...................... B30B 15/02; B30B 15/34
[58] Field of Search .......... 156/251, 515, 581, 583, 156/63, 221, 298, 297, 265, 518, 556, 562; 33/174 G

[56] References Cited
UNITED STATES PATENTS

| | | | |
|---|---|---|---|
| 2,791,265 | 5/1957 | Rolaston et al..................... | 156/251 |
| 3,305,421 | 2/1967 | Raffaelli, Sr....................... | 156/251 |
| 3,655,485 | 4/1972 | Zompa.............................. | 156/63 X |
| 3,802,979 | 4/1974 | Griswold et al................. | 156/265 X |

*Primary Examiner*—William A. Powell
*Assistant Examiner*—M. G. Wityshyn
*Attorney, Agent, or Firm*—Donald N. Halgren; Vincent A. White; Richard B. Megley

[57] ABSTRACT

A die arrangement is provided for use in apparatus for the application of relatively thin overlay designs on suitable plastic sheet material. The die comprises a sharp cutting edge in the shape of the design, the edge being beveled away from the overlay, the overlay area of the die inside the cutting edge having a metal filler covered by a resilient material which extends beyond the die edge to compress the overlay during the simultaneous heating and cutting operation.

4 Claims, 7 Drawing Figures

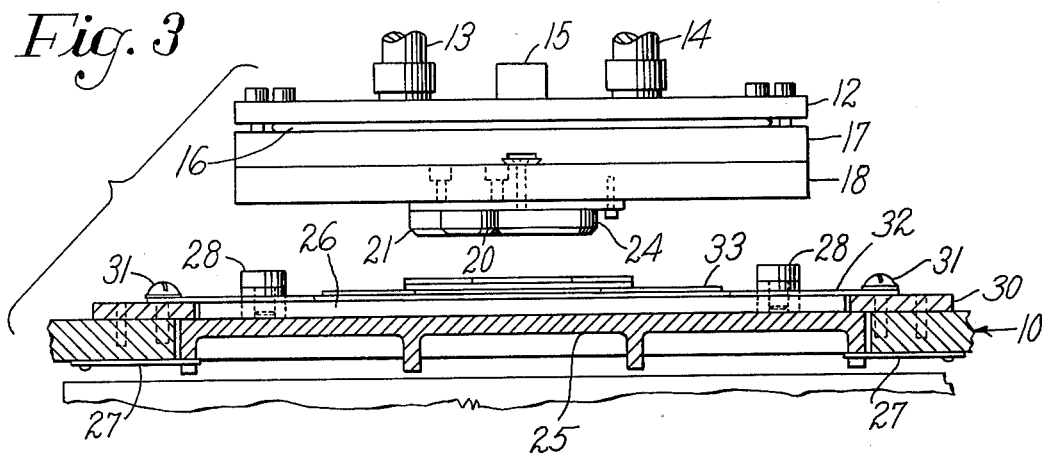
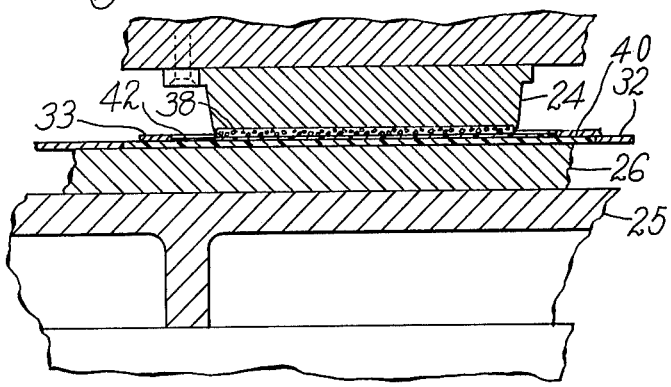
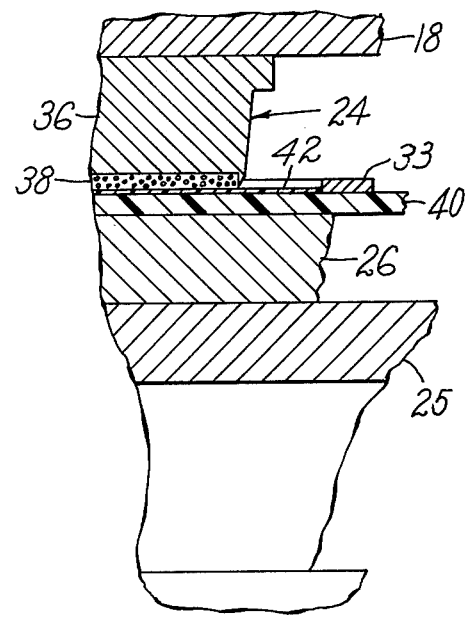
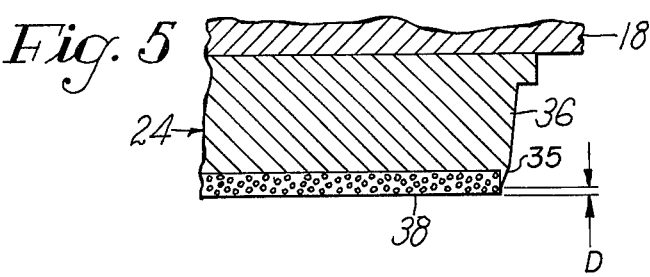
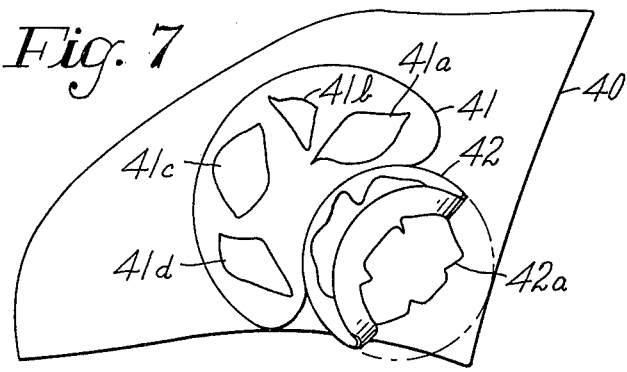

TEAR SEAL APPARATUS

BACKGROUND OF THE INVENTION

In recent years the shoe industry, as well as other manufacturing industries using large amounts of leather and/or cloth, have turned to the substitution of thermoplastic materials for uses formerly employing these more expensive materials. Investigations and experimentation have also devised methods of assembly which may be carried out with the use of automatic machinery on these thermoplastic materials, which have proven to be more economical than the hand labor involved in the assembly of leather and/or cloth materials.

Commercial acceptance of thermoplastic materials as substitutes for the more traditional materials has at times required that the thermoplastic material be processed to resemble the more traditional materials such as leather or cloth. In the shoe industry, for example, decorative bits of leather or cloth which are employed in the shoe upper are frequently of a different color than the adjacent material of the upper. Serious attempts have therefore been made to provide for the application of overlay designs to shoe upper parts of PVC, or other plastic material, to enhance the design of the finished product and to duplicate designs which heretofore would be stitched on the leather or cloth material. In providing the embossing and other features such as simulated stitching, etc., the industry has generally gone to the flow molding process in which a die having the desired features is pressed against the workpiece, placed in a mold, and the workpieces subjected to RF heating under pressure to produce the features on the workpiece surface. To provide colored overlays, such as under consideration in the present invention, the overlays are generally cut to final size and placed by an operator in cavities in the silicone flow molding mold, the workpiece placed in the mold, and the welding or combining of the whole area of overlay achieved by heating under pressure during the flow molding process. However, serious problems exist in practicing this technique.

One of the problems that exists in applying separate overlays to the cavities in a silicone flow molding mold is that of the extensive time consumed during the operation in laying into the mold many small colored pieces needed for some designs. This increases the cost of labor, and the process cost, thus increasing the basic cost of the finished product. Additionally, the positioning of color is restricted to cavities which have been formed in the mold. It can therefore be appreciated that if color could be applied to high points in the mold, greater design latitude would exist and a greater freedom of selecting which areas are to be overlay color, versus base material color, would be obtained. The results would be a better use of material both functionally and costwise.

Another problem existing in the aforementioned practice is that in order to position the overlay stock in the mold, there is generally a need to provide thicker overlay stock material to allow for placement ease as the increase mass of material aids in keeping the overlay in place while adding the base piece to the mold. While the initial thicknesses of overlay material in the past were in the range from 0.08 inch to 0.012 inch, this above requirement has increased the average thickness to the 0.018 inch. It will be obvious that this increase of material thickness, while adding to the ease of manipulation by the operator, increases the cost of material and, what is more important, makes the resultant part stiffer. This stiffness results in a very undesirable feature for color application in flex areas of the workpiece. It might further be observed that even with the above described positioning procedure, the positioning is frequently imperfect requiring hand inking after molding to correct errors in placement of the overlay on the workpiece.

It should also be brought out that in conventional tear seal applications, where the heat sealing occurs only at the periphery of the applique there will be air entrapment between the applique and workpiece in the final product. Notwithstanding the application of pressure to the applique surface during the tear seal process, it has been found that the composite of applique and workpiece will invariably develop air bubbles therebetween upon release from the die, or shortly thereafter. This results in a product of generally undesirable appearance.

Another disadvantage to the present practice occurs in shoe overlays which apparently extend over the lasting margin. Such an application would allow the use of conventional tear seal application of the colored overlay which seals the material only at an adjacent narrow band extending around the overlay. Such peripheral bonding and tear seal applications are commonly found in upholstery and handbag manufacture, which are not flow molded after tear sealing. However, a full peripheral tear seal as required for many colored area designs would trap air between the overlay and the workpiece, which appears as a blister in the flow molded parts.

SUMMARY OF THE INVENTION

Accordingly, it is an object of the present invention to provide a method and device for the positioning of colored overlay pieces, which minimize the need for operator skill and are therefore less costly than the prior art.

A further object of the invention is to provide a method and device for positioning overlay pieces on a workpiece in those areas which are subsequently raised by a flow molding process.

Another object of the invention is to provide a process and apparatus which provides the capability of employing thin overlays to thereby produce less of the stiffening effect in flexural areas of the workpiece, and provide greater economy of material and freedom to employ the overlays in smaller areas than in prior art apparatus.

A further object of the invention is to provide apparatus which positions the overlay to the base stock by means permitting adjustment of overlay positions for any slight movement of the colored edge which might occur in the flow molding process.

Still a further object of the invention is to eliminate bubbles under the flow molding overlay area by providing bubble-free prebonding of the overlay area to the workpiece.

And still another object of the invention is to provide a method and apparatus which makes the use of a plurality of small "islands" of overlay color in shoe design, both practical and economical.

These objects of the invention are achieved by providing die means for use in applying an overlay to a workpiece wherein a conductive filler is disposed within the die means over the entire overlay area and a foam rubber insert covering the conductive material is disposed and so constructed as to protrude beyond the die edge when at operating temperature. The die means is arranged with other constituent elements of the overlay applying apparatus such that the color overlay is properly located onto the workpiece. By application of a suitable temperature and pressure for a specific dwell time the overlay is heat sealed about its periphery and tacked to the workpiece over its entire surface area without air between the overlay and workpiece and with adhesion adequate to avoid any lifting or shifting before insertion into a flow molding machine which subsequently produces a flow molding weld between the overlay piece and the workpiece.

DESCRIPTION OF THE DRAWING

The invention will now be described with reference to a preferred embodiment of apparatus for carrying out a preferred form of method, which apparatus and method are intended to be illustrative of, and not limitative of, the invention. In the description reference will be made to the accompanying drawing wherein:

FIG. 3 is an elevational view, partially in section, showing portions of the structure of FIG. 1 taken on an enlarged scale for clarity;

FIG. 4 is an elevational view partially in section showing a portion of the structure of FIG. 3 on a slightly enlarged scale;

FIGS. 5 and 6 are sectional elevational views showing elements of the structure of FIG. 4 taken on a greatly enlarged scale for clarity; and FIG. 7 is a top plan view showing an article which is a product of the apparatus shown in FIGS. 1 through 6 and the method as disclosed herein.

DESCRIPTION OF THE PREFERRED EMBODIMENT

Figure 1:
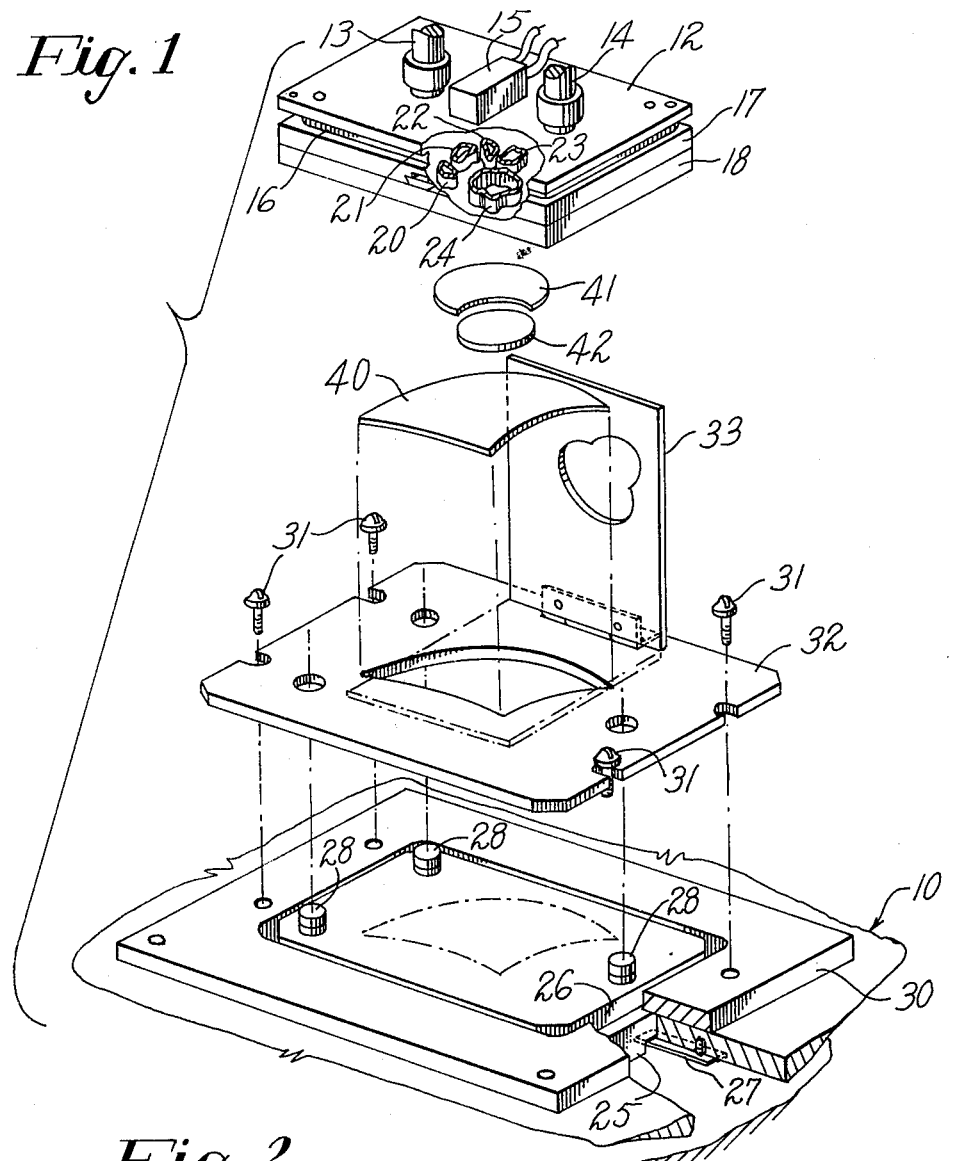
FIG. 1 is an exploded view partially in section showing one form of apparatus for carrying out the present invention.
Figure 2:
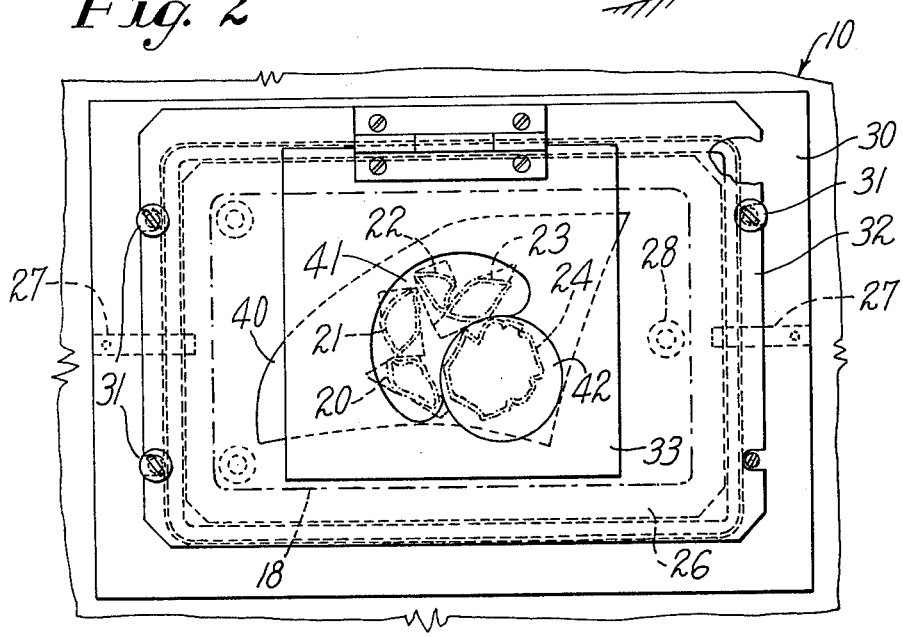
FIG. 2 is a top plan view showing the apparatus of FIG. 1.

Referring now to the drawing, and in particular to FIGS. 1 through 3, there is provided die means for accomplishing the objects of the present invention which is embodied in a suitable press comprising a table 10 and pressure plate 12. The pressure plate 12 is actuated by a pair of shafts 13 and 14. A heating element 15 is attached to the plate 12 and extends through the plate to a heating pad 16 sandwiched between the plate 12 and a retainer plate 17. The retainer plate 17 is provided with a dove-tailed slot for slidably receiving a dove-tailed portion of a die plate 18.

A plurality of die members 20, 21, 22, 23 and 24, each having a different shape in plane view, are mounted on the die plate 18, and each die member has a similar structure which will be explained in detail hereinbelow. Each of the plates 17 and 18 is fabricated of suitable metal construction and both are relatively unyieldable against a surface when pressure is applied through the shafts 13 and 14.

The table 10 is provided with a rigid plate 25 which supports a positioning plate insert 26 on which the workpiece and other elements to be described below are supported. As best shown in FIG. 1, the plate 25 and insert 26 are supported by springs 27 from the table 10 which bias the plate and insert upwardly, while permitting movement of the plate to bottom onto the underlying surface of the table 10.

Mounted on the plate 25 are removable stops 28 which extend through openings in the insert 26, and related structure, to contact the die plate 18 during operation of the device. Referring still to FIG. 1, a positioning plate 30 is mounted on the table 10 with an opening for receiving the positioning plate insert 26 and a plurality of openings for receiving dowel members 31 which are employed to retain suitable jig means for the workpiece and appliques to be operated on by the structure.

A workpiece positioning plate 32 having an applique positioning plate 33 suitably attached thereto by hinge means is removably mounted on the positioning plate 30 by means of dowels 31.

It will be obvious that a plurality of such workpiece positioning plates 32 having applique positioning plates 33 may be interchangeably provided as jig means, each having suitable cutouts depending on the arrangement and size of workpiece, and appliques necessary to form the product of the process.

The opening in the workpiece positioning plate 32 is constructed to receive a base part or workpiece of predetermined shape, such as a shoe part which is to have an applique, or appliques, of various colors applied thereto.

The opening formed in the applique positioning plate 33 may take any shape which is suitable to retain portions of different colored applique material which are to be applied to the workpiece. For purposes of economy, in conserving the amount of material to be employed, the periphery of the opening in the applique positioning plate generally conforms to the periphery of an imaginary envelope encompassing the outer periphery of the dies to be employed in the process.

Referring now to the die members 20, 21, 22, 23 and 24, while each die member is of a different peripheral shape in the embodiment shown, the die members 20 through 24 will apply an applique pattern according to the particular peripheral shape, and the material from which the applique is formed may be of a different color from one applique to another or merely comprise two colors as in the present description. However, each of the dies is of a construction having a configuration in cross section which is best shown in FIGS. 5 and 6 of the drawing.

For exemplary purposes the die 24 is shown in FIG. 5 in the uncompressed condition, and attached to the die plate 18. The die 24 is seen to comprise a sharp metal cutting edge 35 forming the peripheral shape of the desired color overlay design and a metal filler 36 of substantially greater mass than the cutting edge 35. It will be noted that the metal edge 35 is beveled on the exterior side of the die 24 over the entire height of the cutting edge, that is, the bevel is in a direction away from the overlay design area.

Within the boundary of the cutting edge 35 there is disposed a foam rubber insert 38 in the form of a layer of silicone sponge rubber which is attached to the metal filler 36 and protrudes a distance D below the cutting edge 35 in its uncompressed condition. The silicone sponge rubber may be of any suitable type and which will maintain the desired structural integrity as set forth below, and in the present construction the material employed is a silicone sponge rubber manufactured by Connecticut Hard Rubber Company and sold under the name of COHRlastic. The CHORlastic material is of a grade designated R-10480 in either the soft or medium density.

In operation of the device, a workpiece is operated upon by initially assembling the desired workpiece positioning plate 32 onto plate 30, the positioning plate 32 of course having the proper applique positioning plate 33 attached thereto to form a product of specified design. The pressure place 12 is in the fully extended position and is provided with a die plate 18 containing the appropriate dies 20, 21, 22, 23 and 24 to form the specified design. With the members thus assembled, a workpiece 40 is inserted in the opening in the workpiece positioning plate 32, the plate 33 closed upon it, and appliques 41 and 42 of different color are inserted in the opening in the plate 33. With the elements positioned as described, the pressure plate 12 is lowered such that the die members 21, 22, 23 and 24 contact the respective appliques 41 and 42. The die plate 18 is not contacting the stops 28 in this position, and the foam rubber inserts 38 of each of the dies 21 through 24 are in contact with the applique 41 or 42, the die cutting edges 35 being spaced a distance D from the appliques.

At this point in the cycle, heat energy is applied to the heating pad 16 with the simultaneous application of pressure to the die plate 18 to bring the plate 18 into contact with the stops 28. After a suitable dwell time, the plate 18 is lifted from the table 10 and the resultant product, as shown in FIG. 7, is removed from the assembly. The resultant article is a workpiece 40 having a plurality of applique elements heat sealed at their periphery and prebonded or adhesively tacked to the workpiece 40 over the remaining surface. The cutting edge 35 is effective to cut the applique 41 into decorative elements 41a, 41b, 41c and 41d and the applique 42 has been formed into decorative elements 42a. With the elements 41a, 41b, 41c and 41d, or 42a sealed as above to the workpiece 40 the remainder of the applique 41 or 42 is peeled back as demonstrated in FIG. 7.

In providing a die means as shown in FIGS. 5 and 6 of the drawings, Applicant has provided die structure which is greatly improved over prior art devices. The sharp metal cutting edge 35 which is formed in the shape of the desired color overlay design is beveled over its entire thickness in a direction away from the overlay design area. It has been found that this structure gives improved results over those cutting edges where the bevels are both ways or where the bevel is directed toward the overlay design area by the reduction of distortions tending to produce air pockets in the overlay area when a straight or non-beveled side of the die is facing the overlay area.

The metallic filler 36 is generally located with its surface as close to the extremity of the cutting edge 35 as is consistent with maintaining a proper design of the foam rubber insert 38 which will be discussed below. By minimizing the thickness of the foam rubber insert 38 which is attached to this surface there is an increase in the heat that can be conducted through the insert 38 to the overlay from the die for a given temperature differential. In fact, it has been found that with some combinations of overlay thickness, PVC base material, and finish, conductive heat alone can adequately prebond or tack the overlay surface. Where it is found that PVC finish conditions require that some RF energy is necessary in the heating process, it is vital to reduce the natural tendency of RF energy to concentrate on the die edge 35 so that heating the central area to be bonded can be obtained. The above described location of the surface of the metal filler 36 relative to the die 35 is advantageous in reducing this RF energy concentration. In the present embodiment the location of the surface of the metal filler 36 relative to the extremity of the cutting edge 35 is approximately 1/16 inch. However, for smaller overlay areas it has been found that this can be greater, up to approximately 3/4 of an inch due to the conducted heat going into the foam rubber insert 38 from the die cutting edge walls.

As alluded to above, the foam rubber insert 38 protrudes beyond the extremity of the cutting edge 35 a distance D which in the preferred embodiment is at least 0.010 inch, when at operating temperature. The pressure applied to the structure is in the area of 0.5 PSI or more when the insert 38 is compressed to the level of the die edge, as shown in FIG. 6. The insert 38 is thereby effective to compress the applique 41 or 42 into contact with the workpiece 40 and drive out any air pockets therebetween prior to the cutting edge 35 contacting the applique. On further compression, the insert 38 is compressed inside the die an amount equal to the thickness of the overlay, plus approximately 0.005 inch to guarantee cut through while still retaining resilience. It should further be brought out that the cutting edge 35, being beveled away from the die 24, reduces the tendency of the die edge to force the applique material inwardly of the edge and create air pockets or wrinkles in the finished product.

In view of the necessity to maintain the insert 36 extending beyond the cutting edge 35, and thus compress the overlay and force out the air prior to the cutting edge contacting the overlay, it is necessary that the insert 38 retain its resilience and not become set under operating conditions. The material chosen is of a thickness and character such that the compression of 0.005 inch beyond the extremity of the cutting edge 35 plus the thickness of the overlay at 150° to 200°C. at a frequency of once every 5 to 20 seconds with a duration of 1 to 15 seconds dwell does not cause set in the material of an adequate amount to eliminate the desired protrusion beyond the extremity of the cutting edge 35.

While the foam rubber insert 38 may be attached by any known means to the surface of the metallic filler 36, in the preferred embodiment the attachment was made by the use of a common rubber cement which proved adequate under the temperature and pressure conditions as set forth above.

To facilitate operation of the device, the stops 28 are generally adjustable in length so as to limit movement of the die plate 18 to a position wherein the insert 38 compresses an amount equal to the thickness of the overlay plus 0.005 inch before bottoming on the stops.

A temperature control attached to the heating element 15 is set to maintain the cutting edge 35 above approximately 180°F. to reduce the cutting force and the common "snap through" action of cutting brittle goods. The temperature, further, must be below approximately 250°F. to avoid sticking of the PVC, or finish, to the die member. It has been found that a desirable range is from 200°F. degrees to 225°F. degrees with the structure of the present embodiment.

Further, when RF energy is used, to help reduce the difference in RF concentration between the cutting edge 35 and the rubber insert 38, the positioning plate insert 26 is manufactured from a material of low dielectric constant, which in the present embodiment is approximately ¼ inches thick.

As an added advantage, with the present construction as herein described, in most instances the unsealed margin of the applique 41 or 42 is so cleanly cut and loosened from the final decorative elements formed therefrom that the remainder of the applique falls off without performing a tearing procedure, thus increasing the speed of the operation.

What is claimed is:

1. In apparatus for applying an applique of thermoplastic material to a workpiece wherein the applique is formed from a piece of material, heat sealed about its periphery and prebonded or tacked over its entire surface through the application of heat and pressure to provide an applique affixed to the workpiece for subsequent embossing, the combination of work table means and press means in opposed relation for applying pressure therebetween, workpiece positioning means disposed on said work table means for receiving and locating a workpiece of specific contour, applique positioning means overlying said workpiece positioning means for receiving and locating a piece of applique material of specific contour in contact with the workpiece, die means disposed on said press means for forming an applique and sealing said applique about its periphery only under predetermined conditions of temperature and pressure, said die means being located and aligned with said applique piece and having a resilient and compressible insert extending outwardly therefrom and beyond its cutting edge to permit initial contact with said applique material, means for applying pressure between said work table means and said press means and means for applying heat to said die means, said resilient and compressible insert extending beyond said cutting edge of said die to compress said applique on said workpiece and drive out any air pockets therebetween prior to full compression therewith.

2. The apparatus of claim 1 which further comprises adjustable stop means disposed between said work table means and said press means for maintaining said press means in predetermined spaced relation with said work table means when pressure is applied therebetween.

3. The apparatus of claim 1 wherein said resilient and compressible insert is formed from a silicone sponge rubber material.

4. The apparatus of claim 2 wherein said workpiece receiving means comprises a first plate having an opening formed therein conforming to the shape of the workpiece and said applique material receiving means comprises a second plate hingedly supported on said first plate for movement from a position in contact with said first plate to a position remote therefrom and having an opening formed therein conforming to a piece of applique material of predetermined shape.

* * * * *